United States Patent
Barnes et al.

[19]

[11] Patent Number: 6,112,729
[45] Date of Patent: Sep. 5, 2000

[54] DEVICE FOR CONTROLLING EXHAUST GAS RECIRCULATION IN AN INTERNAL COMBUSTION ENGINE

[75] Inventors: Travis E. Barnes, Loveland, Colo.; Michael S. Lukich, Chillicothe; Scott E. Nicholson, Metamora, both of Ill.

[73] Assignee: Caterpillar Inc., Peoria, Ill.

[21] Appl. No.: 09/165,774

[22] Filed: Oct. 2, 1998

[51] Int. Cl.$^7$ .................................................. F02M 25/07
[52] U.S. Cl. ............................. 123/568.21; 123/568.22; 123/568.26
[58] Field of Search .................... 123/568.11, 568.12, 123/568.16, 568.21, 568.22, 568.23, 568.24, 568.25, 568.26, 568.27, 568.28, 568.29, 676, 357; 60/278, 279; 701/108

[56] References Cited

U.S. PATENT DOCUMENTS

| | | | |
|---|---|---|---|
| 4,026,256 | 5/1977 | Fenn | 123/568.27 |
| 4,304,209 | 12/1981 | Straubel | 123/568.27 |
| 4,428,354 | 1/1984 | Sundeen et al. | 123/568.28 |
| 4,433,666 | 2/1984 | Wasaki et al. | 123/568.22 |
| 4,453,379 | 6/1984 | Kawamura et al. | 123/676 |
| 4,601,270 | 7/1986 | Kimberley et al. | 123/357 |
| 4,898,143 | 2/1990 | Sachito et al. | 123/568.22 |
| 5,186,139 | 2/1993 | Matsura | 123/568.28 |
| 5,377,651 | 1/1995 | Sczomak et al. | 123/568.28 |
| 5,520,161 | 5/1996 | Klopp | 123/676 |
| 5,908,022 | 6/1999 | Aoki et al. | 123/568.16 |
| 5,937,639 | 8/1999 | Sasaki et al. | 60/278 |

FOREIGN PATENT DOCUMENTS

| | | |
|---|---|---|
| 0 105 828 A2 | 4/1984 | European Pat. Off. . |
| 4142647 C1 | 12/1992 | Germany . |

OTHER PUBLICATIONS

Patent Abstract of Japan –EP –Publication No. 02169853, Publication Date Jun. 29, 1990 Application No. 63324246, Appl. Date Dec. 22, 1988.
Patent Abstracts of Japan –EP –Publication No. 63143343 Publication Date Jun. 15, 1988 Application No. 612910811, Application Date Dec. 5, 1986.

*Primary Examiner*—Willis R. Wolfe
*Attorney, Agent, or Firm*—Haverstock, Garrett & Roberts

[57] ABSTRACT

The present invention is an apparatus for controlling exhaust gas recirculation in an internal combustion engine. The apparatus includes an exhaust gas recirculation controller that uses sensed engine operating parameters and the engine operational mode to determine whether to enable or disable the exhaust gas recirculation valve. When the valve is enabled, a closed-loop controller determines the desired amount of exhaust gas to recirculate and the corresponding position of the exhaust gas recirculation valve to introduce the desired amount of exhaust gas into the engine's air intake manifold. The desired valve position is converted to a current signal which is transmitted to an actuator to move the valve. When the valve is disabled, the current signal is set to a value to close the valve to prevent exhaust gas from being circulated in the engine's air intake manifold.

13 Claims, 8 Drawing Sheets

Fig. 1.

| ENGINE SPEED (RPM) | DESIRED AIR MASS FLOW (mg/stk) | | | | | | | | |
|---|---|---|---|---|---|---|---|---|---|
| | FUEL QUANTITY (mm^3/inj) | | | | | | | | |
| | FUEL QUANTITY 1 | FUEL QUANTITY 2 | FUEL QUANTITY 3 | FUEL QUANTITY 4 | FUEL QUANTITY 5 | FUEL QUANTITY 6 | FUEL QUANTITY 7 | FUEL QUANTITY 8 | FUEL QUANTITY 9 |
| ENGINE SPEED 1 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 2 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 3 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 4 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 5 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 6 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 7 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 8 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 9 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 10 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 11 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 12 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 13 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |
| ENGINE SPEED 14 | AIR MASS FLOW | AIR MASS FLOW | AIR MASS FLOW | AIR MASS FLOW | AIR MASS FLOW | AIR MASS FLOW | AIR MASS FLOW | AIR MASS FLOW | AIR MASS FLOW |

| EGR TEMPERATURE CORRECTION MAP | | | | | |
|---|---|---|---|---|---|
| COOLANT TEMP. (°C) | TEMP. 1 | TEMP. 2 | TEMP. 3 | TEMP. 4 | TEMP. 5 |
| AIR MASS CORRECTION (mg/stk) | TEMPERATURE CORRECTION 1 | TEMPERATURE CORRECTION 2 | TEMPERATURE CORRECTION 3 | TEMPERATURE CORRECTION 4 | TEMPERATURE CORRECTION 5 |

Fig. 5

| EGR ALTITUDE CORRECTION MAP | | | | | |
|---|---|---|---|---|---|
| ATMOSPHERIC PRESS. (KPa) | $P_1$ | $P_2$ | $P_3$ | $P_4$ | $P_5$ |
| AIR MASS CORRECTION (mg/stk) | ALTITUDE CORRECTION 1 | ALTITUDE CORRECTION 2 | ALTITUDE CORRECTION 3 | ALTITUDE CORRECTION 4 | ALTITUDE CORRECTION 5 |

Fig. 6

| MASS AIR FLOW LINEARIZATION MAP | | | | | | | | | | | | | | | |
|---|---|---|---|---|---|---|---|---|---|---|---|---|---|---|---|
| SENSOR VOLTAGE | $V_1$ | $V_2$ | $V_3$ | $V_4$ | $V_5$ | $V_6$ | $V_7$ | $V_8$ | $V_9$ | $V_{10}$ | $V_{11}$ | $V_{12}$ | $V_{13}$ | $V_{14}$ | $V_{15}$ |
| AIR MASS FLOW (kg/min) | AIR MASS FLOW$_1$ | AIR MASS FLOW$_2$ | AIR MASS FLOW$_3$ | AIR MASS FLOW$_4$ | AIR MASS FLOW$_5$ | AIR MASS FLOW$_6$ | AIR MASS FLOW$_7$ | AIR MASS FLOW$_8$ | AIR MASS FLOW$_9$ | AIR MASS FLOW$_{10}$ | AIR MASS FLOW$_{11}$ | AIR MASS FLOW$_{12}$ | AIR MASS FLOW$_{13}$ | AIR MASS FLOW$_{14}$ | AIR MASS FLOW$_{15}$ |

Fig. 7 -

EGR ACTUATOR LINEARIZATION MAP

| EGR CONTROL (mbar vac) | EGR CONTROL 1 | EGR CONTROL 2 | EGR CONTROL 3 | EGR CONTROL 4 | EGR CONTROL 5 | EGR CONTROL 6 | EGR CONTROL 7 | EGR CONTROL 8 | EGR CONTROL 9 |
|---|---|---|---|---|---|---|---|---|---|
| EGR CURRENT (ma) | EGR CURRENT 1 | EGR CURRENT 2 | EGR CURRENT 3 | EGR CURRENT 4 | EGR CURRENT 5 | EGR CURRENT 6 | EGR CURRENT 7 | EGR CURRENT 8 | EGR CURRENT 9 |

DEVICE FOR CONTROLLING EXHAUST GAS RECIRCULATION IN AN INTERNAL COMBUSTION ENGINE

TECHNICAL FIELD

The present invention relates generally to internal combustion engines and, more particularly, to a system for controlling exhaust gas recirculation in an internal combustion engine.

BACKGROUND

Recirculation of a controlled amount of diesel engine exhaust gas to the engine air intake is generally known to provide a beneficial reduction in diesel engine emissions of oxides of nitrogen oxide. Limits are conventionally imposed on the amount of recirculated exhaust gas to avoid excessive engine intake air charge dilution which may degrade engine performance and increase particulate emission levels.

An internal combustion engine may operate in a variety of different closed loop and open loop modes based upon a variety of monitored engine operating parameters. Some typical operating closed loop modes include a cold mode, a warm mode, a cranking mode, a low idle mode, and a high idle mode. In-between the low idle mode and the high idle mode, the engine may run in an open loop mode where fuel is delivered based on engine throttle position and engine speed. Various engine operating parameters may be monitored to determine the engine operating mode including engine speed, throttle position, vehicle speed, coolant temperature, and oil temperature, as well as others.

Various control systems for exhaust gas recirculation are known in the art. U.S. Pat. No. 5,377,651 discloses a closed-loop control system for exhaust gas recirculation wherein the calculations for determining the amount of exhaust gas to recirculate are computed continuously throughout the engine's operational cycle. However, it may be undesirable to have the exhaust gas recirculated during certain engine operating modes, such as when the engine is cold or cranking, or when it is undesirable to reduce the amount of air available for combustion. It is also desirable to stop recirculating exhaust gas if the engine has been idling for an extended period of time. The calculations for determining the amount of exhaust gas to recirculate in the engine consume valuable data processing time. It is therefore desirable to include means in a system to bypass the calculations for the amount of exhaust gas to recirculate, thereby disabling exhaust gas recirculation, when the engine is operating in a mode where there is no need for recirculated exhaust gas.

Accordingly, the present invention is directed to overcoming one or more of the problems as set forth above.

DISCLOSURE OF THE INVENTION

The present invention is an apparatus for controlling exhaust gas recirculation in an internal combustion engine. The apparatus includes an exhaust gas recirculation controller that uses sensed engine operating parameters and the engine operational mode to determine whether to enable or disable the exhaust gas recirculation valve. When the valve is enabled, a closed-loop controller determines the desired amount of exhaust gas to recirculate and the corresponding position of the exhaust gas recirculation valve to introduce the desired amount of exhaust gas into the engine's air intake manifold. The desired valve position is converted to a current signal which is transmitted to an actuator to move the valve. When the valve is disabled, the current signal is sent to a value to close the valve to prevent exhaust gas from being circulated in the engine's air intake manifold.

BRIEF DESCRIPTION OF DRAWINGS

FIG. 3 is an example of a desired air mass flow table;

BEST MODE FOR CARRYING OUT THE INVENTION

Figure 1:
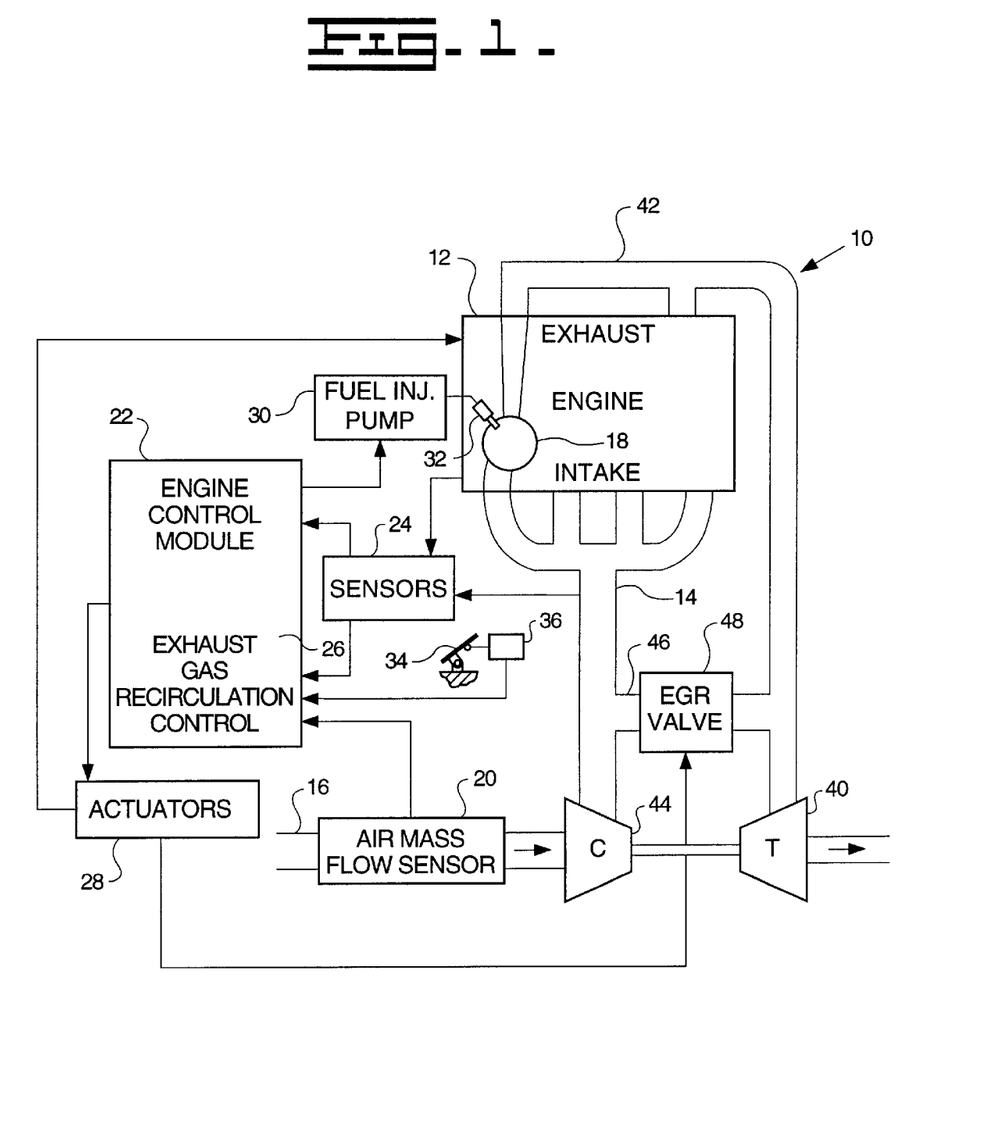
FIG. 1 is a block diagram of an engine and engine controller with which the present device may be utilized.

Throughout the specification and figures, like reference numerals refer to like components or parts. Referring to FIG. 1, there is shown a block diagram of an turbocharged engine system 10 including a diesel engine 12 into which air is drawn through an intake manifold 14 via air intake conduit 16. For illustrative purposes, only one cylinder 18 of the diesel engine 12 is shown, it being understood that the engine 12 may have any number of other cylinders as desired. Further, the present invention for controlling exhaust gas recirculation is not limited to use in engines having a turbocharger or engines using a particular type of fuel. A conventional air mass flow sensor 20 for providing a measure of the mass airflow into the engine 12 to an engine control module 22. The engine control module 22 may take the form of a standard digital computer containing such generally known components as a central processing unit, and both volatile and non-volatile memory. The computer periodically reads and processes inputs from the air mass flow sensor 20 and other engine sensors 24, and through execution of control routines, such as an exhaust gas recirculation (EGR) control routine 26 stored in computer memory, generates and outputs a series of commands to actuators 28.

Fuel is metered into engine cylinder 18 through the operation of a fuel injection pump 30 that delivers fuel pulses timed to engine rotation events to fuel injectors, such as injector 32 which delivers fuel to combustion space in the cylinder 18. The fuel injection pump 30 is controlled by the engine control module 22 to meter appropriate amounts of fuel to the engine cylinders with each fuel injection event, such as determined from the timing of the engine rotation events. Generally, the vehicle operator dictates the appropriate amounts of fuel to be metered by positioning a throttle or accelerator pedal 34, the position of which is transduced by pedal position sensor 36, which may be a potentiometric position sensor providing an output signal indicative of pedal 34 displacement away from a rest position to the computer in the engine control module 22.

Turbochargers are conventionally used in internal combustion engines to increase the amount of injected intake air so as to increase the output of the engine. As shown in FIG. 1, turbochargers generally consist of a turbine compartment 40 containing a turbine wheel (not shown) mounted in the exhaust manifold 42 of the engine 12 and a compressor compartment 44 containing a compressor wheel (not shown) is coupled to the turbine wheel and mounted in the intake manifold 14 of the engine. As exhaust gases flow past the turbine wheel, it is rotated, causing the compressor to also rotate which increases the pressure of the intake air being charged into the engine cylinders, mixing with fuel and thereafter undergoing combustion. An air passage 46 is provided as a path through which a controlled portion of the exhaust gas is recirculated to the engine intake manifold 14, to reduce the level of $NO_x$ discharged from the engine 12. An EGR valve 48 is disposed in the air passage 46 to provide control authority over the amount of exhaust gas recirculated through the engine intake manifold 14.

The factors affecting the air flow into the engine cylinders 18 are the temperature and pressure of the air inducted in the air intake manifold 14, and the engine volumetric efficiency. The volumetric efficiency can be mapped as a function of the engine operating conditions. Using the air intake manifold 14 conditions and the engine operating conditions, the flow into the cylinders 18 can be predicted. By measuring the fresh air entering the engine 12, the amount of EGR can be estimated from the difference in the air mass flow and the fresh air flow. The temperature and pressure of the air in the air intake manifold 14 are measured using sensors 24 such as a thermocouple and barometer, which are well known in the art. Other input signals from the sensors 24 to the engine control module 22 generally recognized in conventional engine control are provided, such as engine coolant temperature, output from a conventional thermocouple in the engine coolant path (not shown), and engine speed, output from a conventional hall effect sensor positioned to sense passage of the teeth of a toothed wheel (not shown) that rotates with the engine output shaft. The engine control module 22 provides information on the operating mode of the engine, such as when the engine ignition is cranking in the start mode, when the engine 12 is running in idle mode, and when the engine 12 is operating under a load. The engine control module 22 also provides information regarding the amount of fuel injected in each cylinder 18 during each injection cycle. One value that may be used is a fuel quantity value, as is well-known in the art, typically measured in cubic millimeters per injection cycle, however, any signal indicative of the fuel quantity being delivered to the engine may be used.

Figure 2:
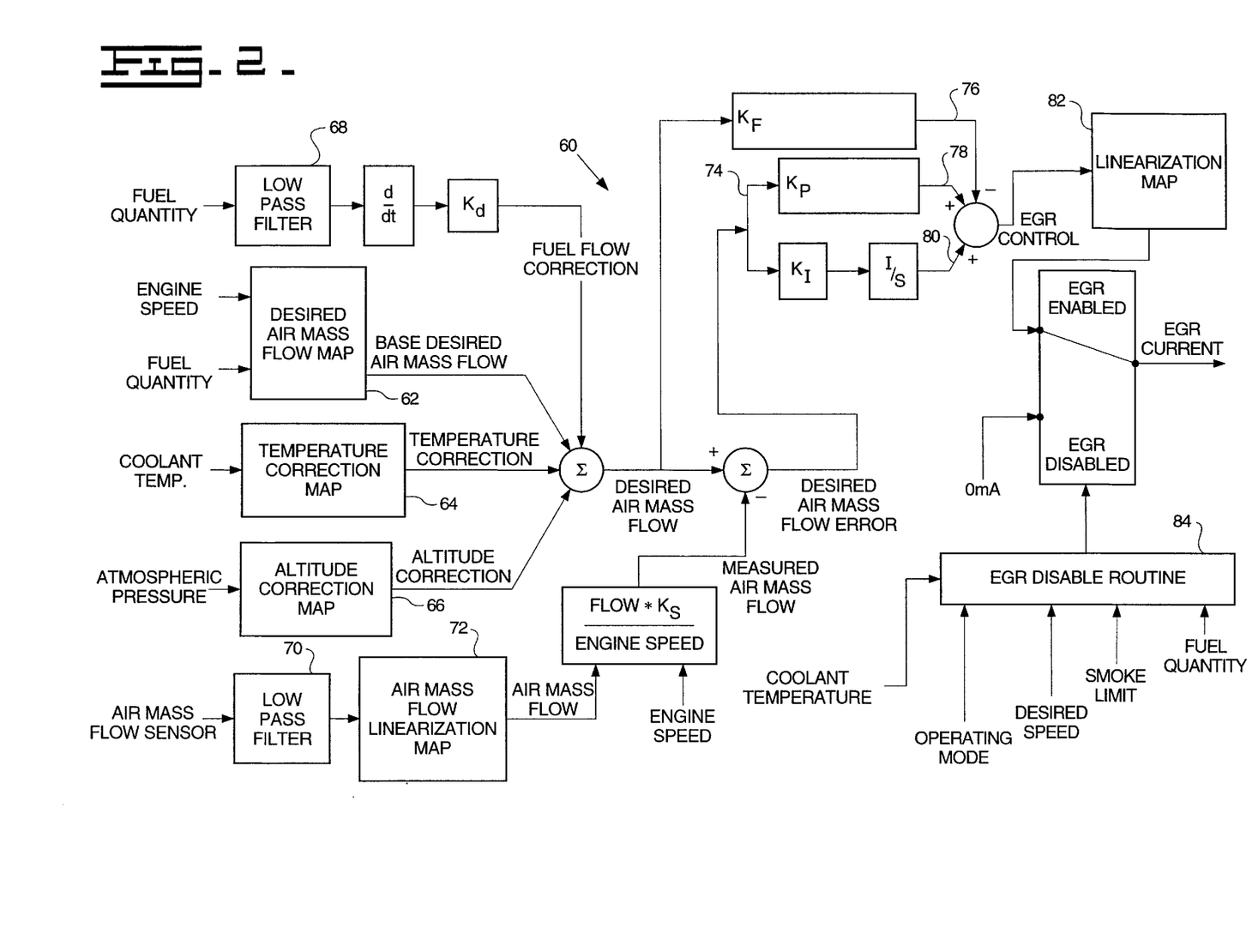
FIG. 2 is a block diagram view of the present invention for controlling exhaust gas recirculation.

The estimated EGR can be used as feedback for closed loop EGR control 26. FIG. 2 shows a block diagram of an embodiment of a closed loop EGR control system 60 according to the present invention. The base desired air mass flow signal is determined by using engine speed and fuel quantity signals as input to a desired air mass flow map 62, such as shown in FIG. 3, which may be implemented in a table look-up software routine as is well known in the art. For the table in FIG. 3, as well as for other tables described hereinbelow, the values respectively assigned to each row and column may be incremental, but are not necessarily expressed in even increments. The values contained in the tables will depend on the particular engine model to be equipped with EGR and may be clustered around particular engine speeds for finer resolution and better control in a particular operating speed range in order to meet a particular emissions standard. It should also be understood that the size of the tables herein are illustrative only, the actual size of the tables being dictated by the performance characteristics to be achieved.

Figure 4:
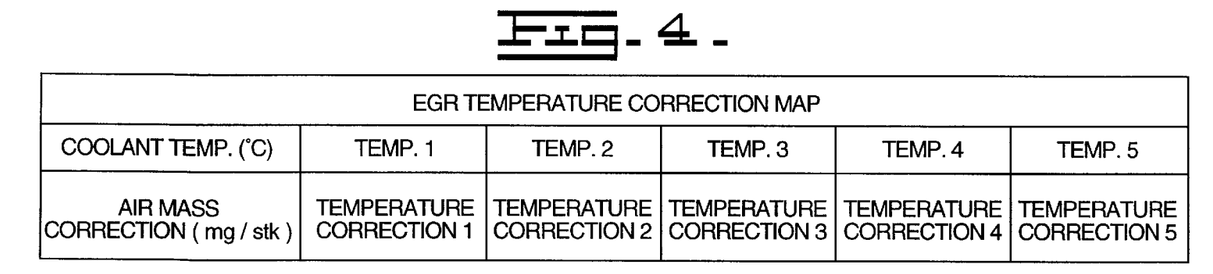
FIG. 4 is an example of an EGR temperature correction map.
Figure 5:
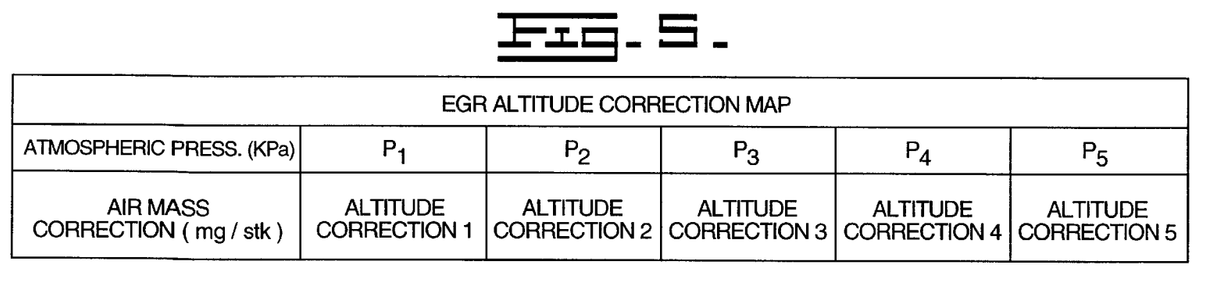
FIG. 5 is an example of an EGR altitude correction map.

The example desired air mass flow map 62 in FIG. 3 contains the standard desired EGR mass flow for a given temperature and ambient pressure. In order to obtain correct values for the desired air mass flow, the baseline value obtained from the table must be corrected for variations in ambient pressure and engine coolant temperature that occur when the engine is operated under conditions that differ from baseline conditions. A temperature correction map 64 is used to adjust the base desired air mass flow for engine temperature variation. FIG. 4 shows an example of a temperature correction map as a function of engine coolant temperature. The desired EGR modification is expressed in units of milligrams per stroke. Similarly, an altitude, or atmospheric pressure correction map 66, is used to adjust the desired air mass flow for variations in atmospheric pressure that are due to differences in altitude or changes in the weather. An example of an altitude correction map 66 is shown in FIG. 5, where atmospheric pressure is input to determine the desired EGR correction value in units of milligrams per stroke. Since the coolant temperature and the ambient pressure change at relatively slow rates, the table look-up routines may be performed at frequencies ranging from approximately 1 Hertz to 10 Hertz.

The base desired air mass flow may be further adjusted for sudden changes in operating conditions as a function of the rate of change in fuel flow. To determine the fuel flow adjustment, the current fuel quantity value is input to a low pass filter 68. The time derivative of the output of the low pass filter 68 is computed, and the resulting derivative value is multiplied by a gain factor $K_d$ to obtain a fuel flow correction.

Figure 6:
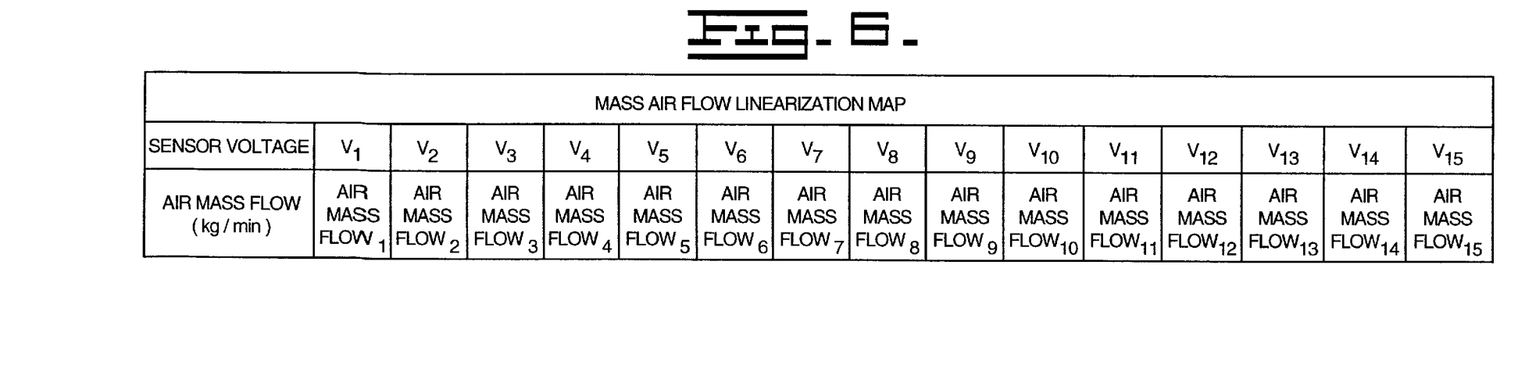
FIG. 6 is an example of an air mass flow linearization map.

The desired air mass flow is obtained by summing the base desired air mass flow, the temperature correction, the altitude correction, and the fuel flow correction values. To obtain a desired air mass flow error signal, a measured air mass flow signal is subtracted from the desired air mass flow. The measured air mass flow signal is derived from the air mass flow sensor signal that is input to a low pass filter 70. The filtered sensor signal is then input into an air mass flow linearization map 72 to obtain a linearized air mass flow from the non-linear sensor input. An example of an air mass flow linearization map 72 is shown in FIG. 6 wherein the air mass flow sensor signal ranges from 0 to 5 volts and a corresponding air mass flow signal is output in kilograms per minute. The linearized air mass flow is multiplied by a scaling constant and divided by the engine speed to convert the signal from units of kilograms per minute to units of milligrams per stroke. A preferred value for the scaling constant is $K_s$=[(1000 milligrams per kilogram)/(number of cylinders firing per revolution)]. It is important to note that any desired units may be used in the present invention, and the signals scaled accordingly. The units shown in the example tables herein are illustrative and are not meant to limit the present invention to particular units of measurement.

Figure 7:
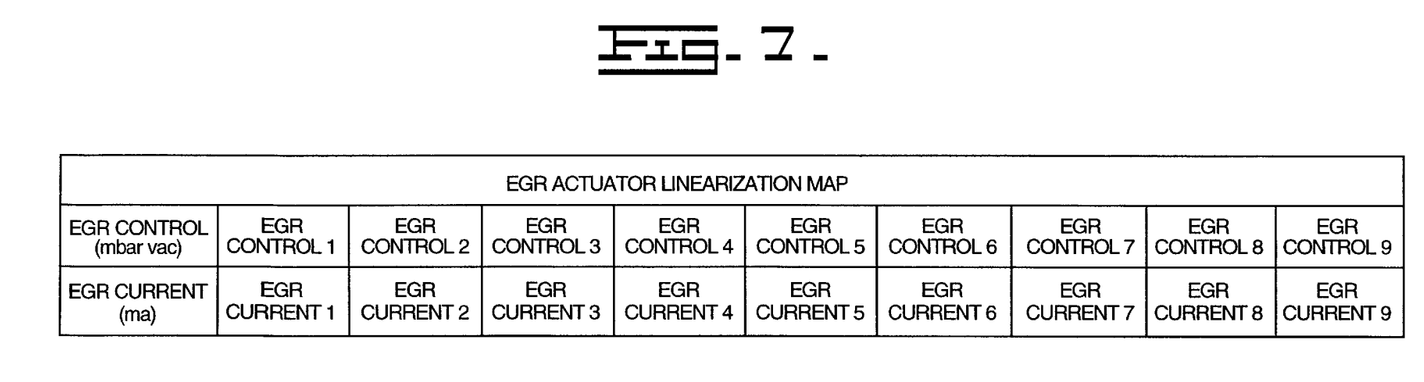
FIG. 7 is an example of an EGR actuator linearization map.

The present invention includes a proportional-integral control law 74 with a feed forward term 76 to form a signal for the EGR current required to achieve the desired air mass flow. In the proportional-integral control law 74, the desired air mass flow error signal is multiplied by a gain factor $K_p$ to calculate the proportional signal 78, and the error signal is multiplied by another gain factor $K_I$ and integrated to calculate the integral signal 80. If the EGR is disabled and then re-enabled, it is important to have means for re-initializing the integral term every time the EGR is re-enabled, such as through the use of an initialization pass each time this section of code is executed for the first time after the EGR is re-enabled. In the feed-forward term, the desired air mass flow is multiplied by gain factor $K_F$ and then subtracted from the sum of the proportional signal 78 and integral signal 80 to calculate an EGR control signal. The EGR control signal may then be limited between an upper and a lower limit (not shown). A linearization map 82 is used to linearize the EGR control signal in, preferably, millibars vacuum for output to the EGR actuator (not shown) in milliamps. An example of the linearization map 82 is shown in FIG. 7. Although the EGR control signal has been described in terms of millibars vacuum, it is to be understood that the output of the EGR controller may be expressed as a percentage, millibars pressure, and the like.

Figure 8A:
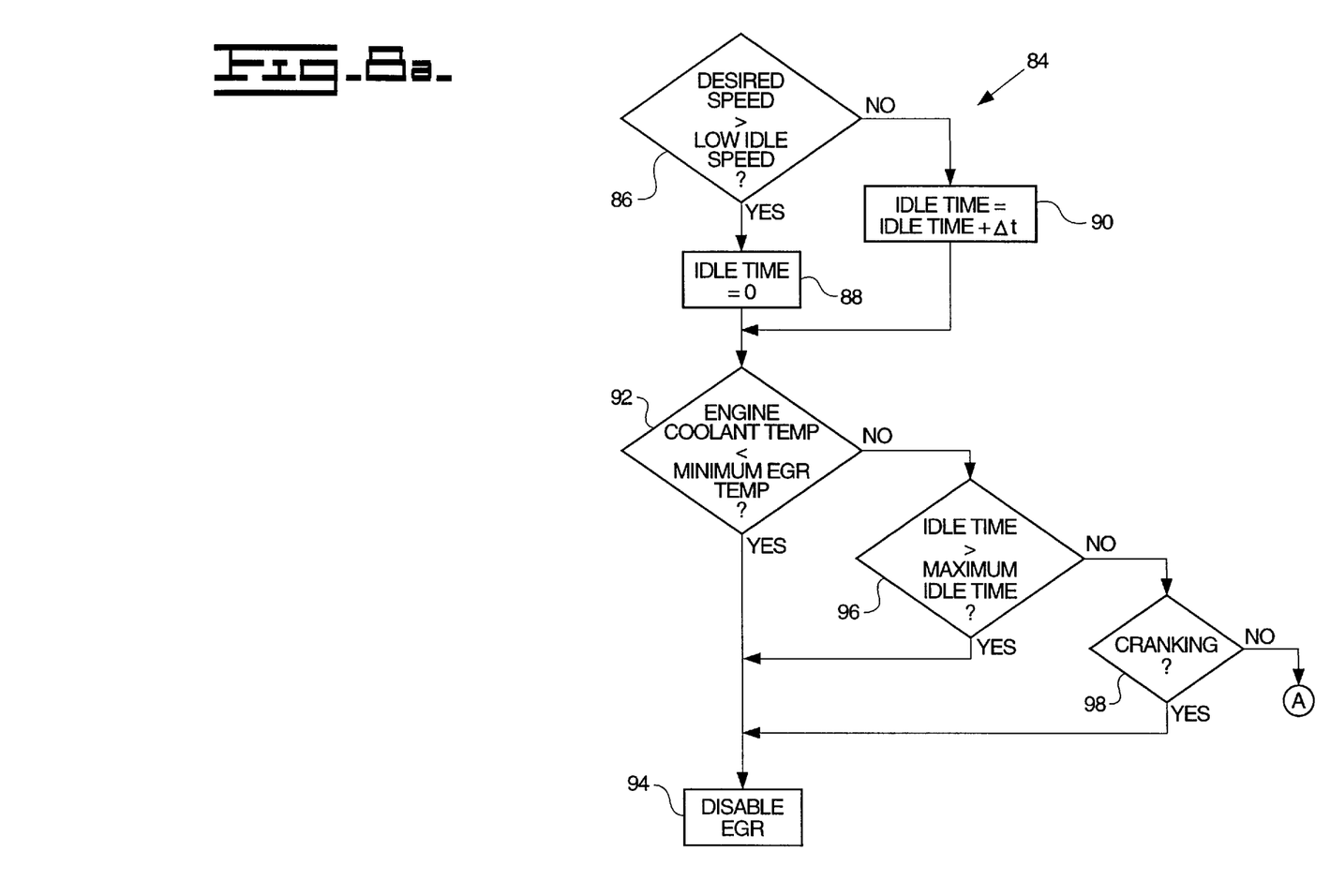
FIGS. 8a and 8b are a flowchart diagram of the logic for disable exhaust gas recirculation according with the present invention.
Figure 8B:
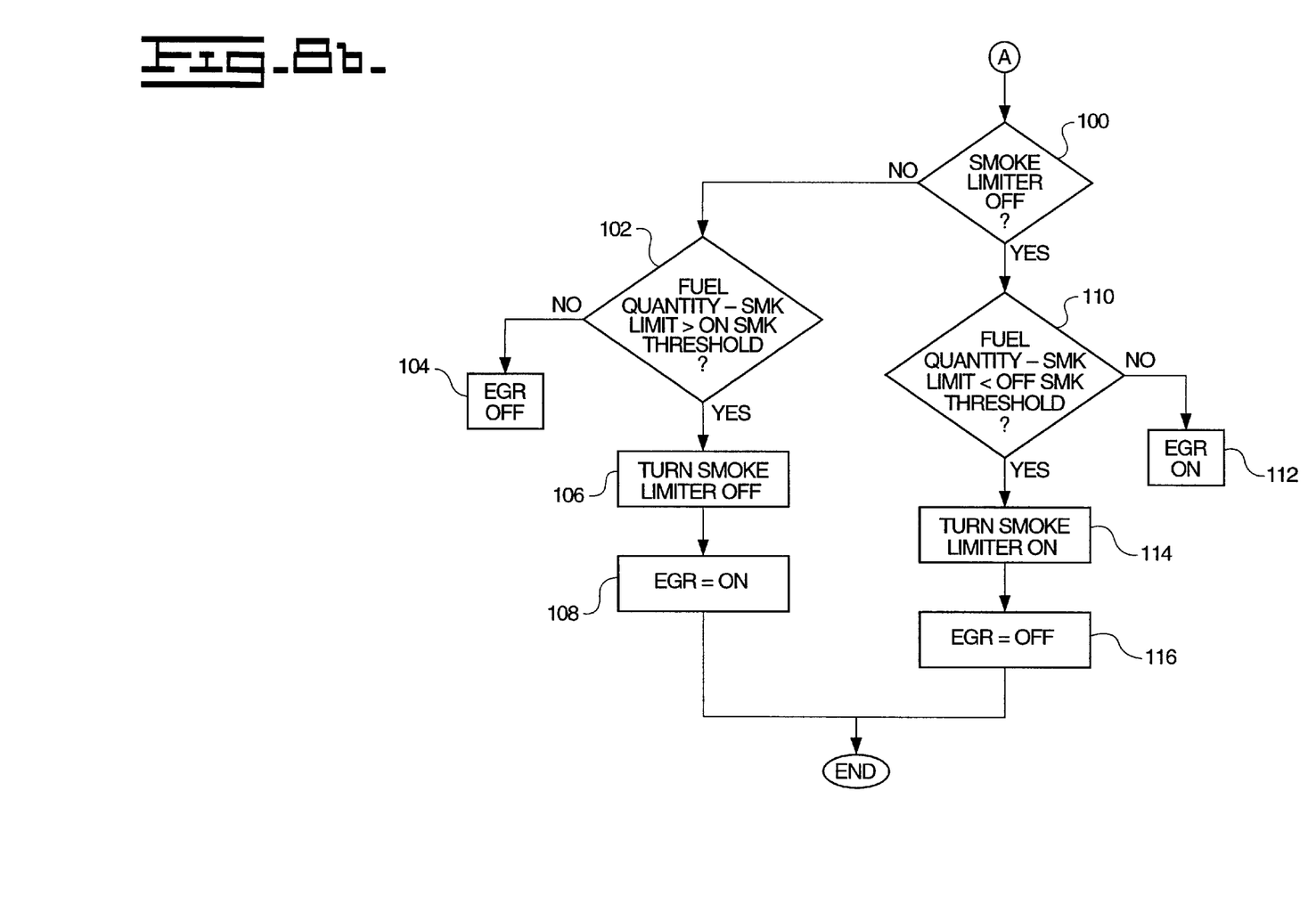

If the EGR is disabled, the EGR current is set to 0 milliamps or any other value that will position the EGR valve 48 to inhibit recirculation of exhaust gases. If the EGR is enabled, the linearized EGR current signal is sent to the EGR actuator (not shown) to move the EGR valve 48 to the desired position. To determine whether the EGR should be enabled, an EGR Disable Routine 84, as shown in FIG. 8, is executed. The EGR Disable Routine 84 disables the closed loop EGR control system 60 under circumstances where recirculation of the exhaust gas results in suboptimal engine performance. For example, when the engine is cold, it is undesirable to recirculate exhaust gas because the exhaust gas may contain a greater number of particulate emissions than when the engine is operating at higher temperatures. The engine temperature is not yet high enough to burn the emissions out of the exhaust gas and therefore, the level of $NO_x$ is not reduced and more contaminants are introduced in the engine intake and combustion chambers than desired. Another instance when it is undesirable to recirculate exhaust gas is under loaded conditions when the fuel flow is near a level where the exhaust gas will contain more smoke than desired if the amount of air available is reduced. Additionally, if the engine has been idling for an extended period of time, it is also not desirable to recirculate the exhaust gas.

In the diagram shown in FIG. 8, the EGR Disable Routine first evaluates whether the desired engine speed is greater than low idle speed 86. If so, then an idle run timer is reset to zero at block 88. Otherwise, the idle run timer is incremented at block 90 to provide information on the amount of time the engine has been running at idle speed. Beginning at block 92, the EGR Disable Routine 84 tests conditions under which EGR will be disabled. The conditions may be tested in any order, preferably in the order in which they are most likely to occur. At block 92, the EGR is disabled at block 94 if the engine coolant temperature is less than a predetermined coolant temperature, denoted as minimum EGR temperature in block 92. The number used for the minimum EGR temperature depends on the particular engine on which the present invention is used and may be a constant or a variable that is dependent on one or more other engine operating parameters. If the condition in block 92 is not met, the EGR Disable Routine 84 may then test whether the engine has been in idling for more than a predetermined amount of time at block 96. If so, then EGR is disabled at block 94. Otherwise, another condition is tested at block 98 to determine if the engine is in crank mode. If so, then EGR is disabled at block 94.

If the three conditions set forth in blocks 92, 96, and 98 are not met, a further condition is tested at block 100, namely, whether a smoke limiter flag is set. The smoke limiter flag indicates if the EGR is disabled due to amount of fuel being metered to the engine, or the rack, is close to or at the smoke limit. The smoke limit is set in the engine control module 22 using a smoke map, which limits the amount of smoke produced by the engine as a function of air manifold pressure or boost pressure, ambient temperature and pressure, and engine speed. The maximum allowable fuel quantity signal produced by the smoke map limits the quantity of fuel based on the quantity of air available to prevent excess smoke. The smoke limit flag is set internally in portions of the EGR Disable Routine 84 as described hereinbelow. If the smoke limiter flag is not set, a test for whether the fuel quantity minus the smoke limit is greater than an "on smoke threshold" amount of fuel in block 102. The "on smoke threshold" is the threshold between fuel and smoke limit that will enable EGR. The value for the "on smoke threshold" depends on the particular engine with which the present EGR control system 60 is being used. The value may be a constant or a variable that is set manually through an operator interface or through a function implemented in software. If the condition in block 102 is not met, then EGR is disabled at block 104. Otherwise, the smoke limiter flag is set to "false" or "off" at block 106 and the EGR enable flag is set to "true" or "on".

If the condition at block 100 was met, i.e., if the smoke limiter flag is "off", then a condition is tested at block 110 to determine whether the fuel quantity minus the smoke limit is less than an off smoke threshold. The off smoke threshold is a threshold value between fuel quantity and smoke limit that will disable the EGR. The value for the "off smoke threshold" depends on the particular engine with which the present EGR control system 60 is being used. The value may be a constant or a variable that is set manually through an operator interface or through a function implemented in software. If the condition in block 110 is not met, then the EGR enable is set to "true" or "on" at block 112. Otherwise, the smoke limiter flag is set to "true" or "on" and the EGR is disabled at blocks 114 and 116, respectively. In the embodiment of the EGR Disable Routine 84 shown in FIG. 8, control is returned back to the EGR control system 60 software. It should be noted, however, that additional conditions for enabling or disabling the EGR may be tested in other embodiments of the EGR Disable Routine 84, depending on the operational characteristics of a particular engine with which the present invention is utilized. Likewise, it may be determined that the EGR Disable Routine 84 should only test a subset of the conditions shown in FIG. 8 and described hereinabove, or that different conditions should be tested instead.

Figure 9:
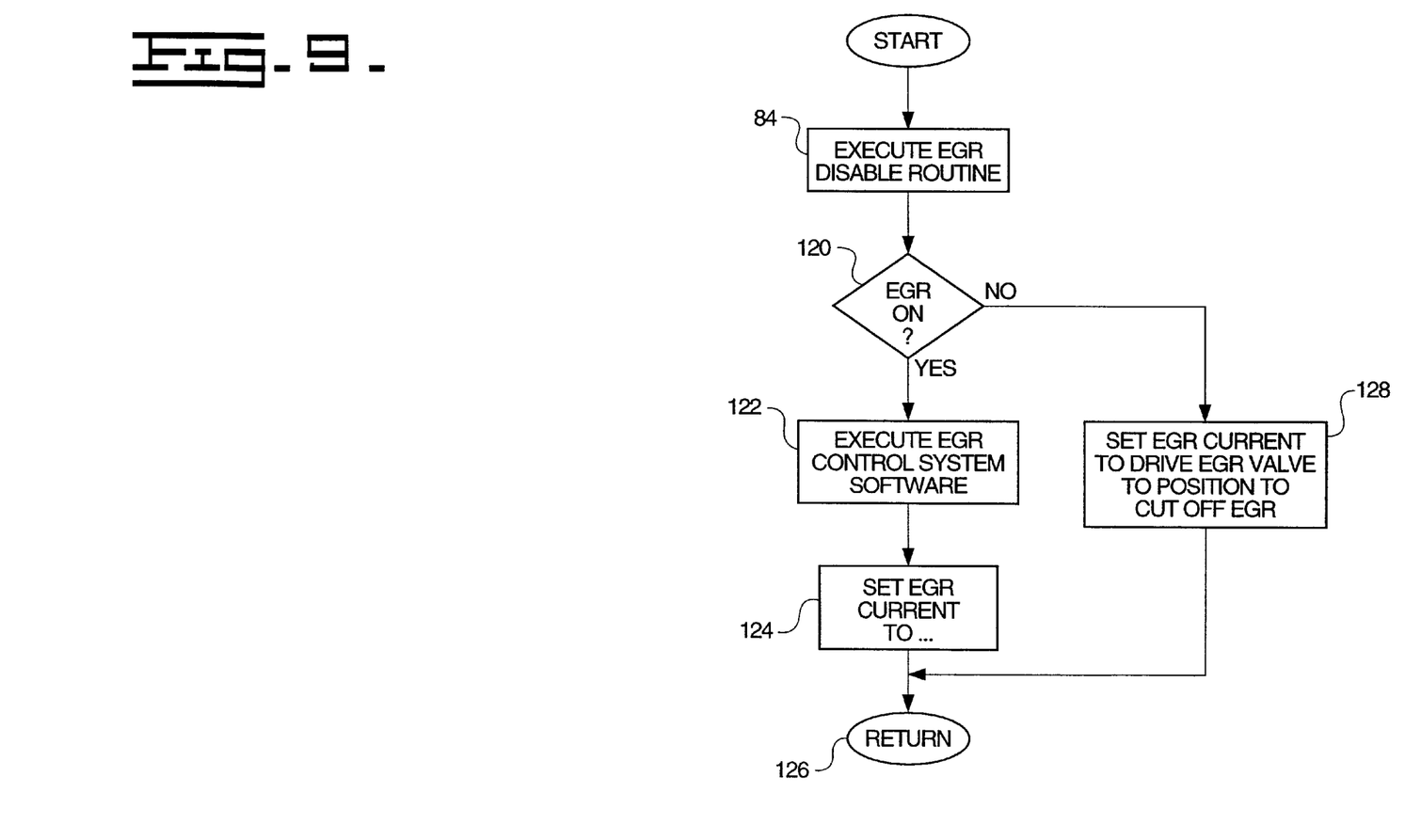
FIG. 9 is a flowchart diagram of the logic for executing the EGR control system software based on the status of the EGR enable/disable signal.

An important aspect of the EGR Disable Routine 84 is that it may be executed independently of the rest of the EGR control system 60 software as shown in the flowchart in FIG. 9. At block 120, if the EGR is enabled, the portions of the EGR control system software that calculate the desired position of the EGR valve are executed as indicated in block 122. In block 124, the EGR current is set to the value resulting from the linearization map 82 and the control of the program execution is returned to the calling routine, such as the engine control module 22, as shown at block 126. If the EGR is disabled, then the EGR current is set to a value to move the EGR valve 48 to a position that minimizes or eliminates recirculation of exhaust gas, as shown at block 128. Control of the software execution is then returned to the calling routine, such as the engine control module software, as shown at block 126.

Industrial Applicability

The EGR control system in accordance with the present invention reduces NOx emissions and enhances fuel combustion, thereby promoting greater fuel efficiency. When the engine is cold, or is at idle conditions for an extended period of time, the present EGR control system helps maintain the air/fuel ratio in a more efficient range by disabling EGR completely. This strategy has the additional advantage of saving computational resources because the calculations and table look-up routines required to compute the amount of exhaust gas to recirculate are not executed when EGR is disabled.

When EGR is enabled, heat is absorbed, resulting in a slower, cooler, combustion process which lowers the level of unburned hydrocarbons in the exhaust gas and reduces $NO_x$. Further, the EGR system raises the exhaust temperature of the engine due to the displacement of cold intake air with hot exhaust gas, resulting in earlier activation and more efficient operation of catalytic converters, if installed, for removing pollutants from the exhaust stream.

The present EGR valve 48 is electronically actuated, and provides for high speed, accurate response to varying engine loads. The EGR control 26 in the electronic control module 22 also provides a precise determination of optimum exhaust gas recirculation rates and precise positioning of the EGR valve 48. As a result, the engine 12 responds with rated power over its range of operating conditions and the undesirable effects of black smoke and/or engine stalling due to the introduction of too much recirculated exhaust gas, which is a common problem with prior art EGR control systems, is eliminated.

Other aspects, objects and advantages of the present invention can be obtained from a study of the drawings, the disclosure and the appended claims.

What is claimed is:

1. An apparatus for controlling an exhaust gas recirculation valve in an internal combustion engine, the apparatus comprising:

an engine speed sensor;

the data processing means being operable to compute the elapsed time that the engine is running at a speed that is less than or equal to the engine's low idle speed and to transmit a signal to disable the exhaust gas recirculation valve when the elapsed time exceeds a predetermined idle time limit.

2. An apparatus for controlling an exhaust gas recirculation valve in an internal combustion engine, the apparatus comprising:

an engine speed sensor;

an engine temperature sensor;

an engine idle timer operable to produce a signal to indicate the amount of time the engine has run at less than or equal to idle speed; and data processing means operable to receive signals from the engine speed sensor, the engine temperature sensor, and the engine idle time and to transmit a signal to enable or disable the exhaust gas recirculation valve based on the sensor data values and engine idle time.

3. A method adapted to control an exhaust gas recirculation valve in an internal combustion engine, the method comprising the steps of:

establishing an actual fuel quantity to be delivered to an the engine;

establishing a smoke limit fuel quantity;

determining a difference between said smoke limit fuel quantity and said actual fuel quantity;

controlling the recirculation valve in response to said difference, said control including one of disabling and enabling said valve.

4. A method, as set for in claim 3, further including the steps of:

enabling said recirculation valve in response to said difference exceeding a smoke threshold; and disabling said recirculation valve in response to said difference being less than said smoke threshold.

5. A method, as set forth in claim 4, further including the steps of:

establishing said smoke threshold as a first value when said recirculation valve is enabled; and establishing said smoke threshold as a second value when said recirculation valve is disabled.

6. An apparatus for controlling exhaust gas recirculation in an internal combustion engine, the apparatus comprising:

an air passage connected between an air intake manifold and an exhaust manifold;

an exhaust gas recirculation valve disposed in the air passage, the exhaust gas recirculation valve operable to receive a control signal and regulate a flow of exhaust gas from the exhaust manifold to the intake manifold in response to said control signal; and an electronic control module operable to compute an elapsed time that the engine is running in idle and to transmit said control signal to enable or disable the exhaust gas recirculation valve in response to said elapsed time.

7. The apparatus, as set forth in claim 6, wherein said electronic control module is further operable to compute said elapsed time that the engine is running in idle and to disable the exhaust gas recirculation valve when the elapsed time exceeds a predetermined amount of time.

8. The apparatus, as set forth in claim 7, wherein said electronic control module is further adapted to establish a smoke limit signal and a fuel quantity signal, and to enable or disable said exhaust gas recirculation valve based on the smoke limit signal and the fuel quantity signal.

9. The apparatus, as set forth in claim 8, further comprising a desired air mass flow map;

said electronic data module being further operable to determine a desired exhaust gas recirculation air mass flow from the desired air mass flow map based on at least one engine operational parameter.

10. The apparatus, as set forth in claim 9, further comprising a temperature correction map;

said electronic data module being further operable to determine a temperature correction value from the temperature correction, the temperature correction value being based on at least one engine operational parameter, the temperature correction value being used to correct the desired air mass flow for temperature variations.

11. The apparatus, as set forth in claim 10, further comprising an altitude correction map;

said electronic data module being further operable to determine an altitude correction value from the altitude correction map, the altitude correction value being based on at least one engine operational parameter, the altitude correction value being used to correct the desired air mass flow for atmospheric pressure variations.

12. The apparatus, as set forth in claim 11, further comprising:

an air mass flow sensor operable to transmit an air mass flow sensor signal;

a mass air flow linearization map for converting the air mass flow sensor signal to an actual air mass flow; and said electronic data module being further operable to determine an air mass flow error value based on the desired air mass flow and the actual air mass flow.

13. The apparatus, as set forth in claim 12, wherein said electronic data module is operable to compute a signal representing desired exhaust gas recirculation valve position based on the desired air mass flow error value.

* * * * *